May 21, 1968

R. E. ANDERSON 3,384,891

METHOD AND SYSTEM FOR LONG DISTANCE NAVIGATION AND COMMUNICATION

Filed Feb. 11, 1965

Inventor
Roy E. Anderson
by Charles W. Helzer.
His Attorney

May 21, 1968

R. E. ANDERSON 3,384,891

METHOD AND SYSTEM FOR LONG DISTANCE
NAVIGATION AND COMMUNICATION

Filed Feb. 11, 1965

Inventor
Roy E. Anderson
by Charles W Helzer
His Attorney

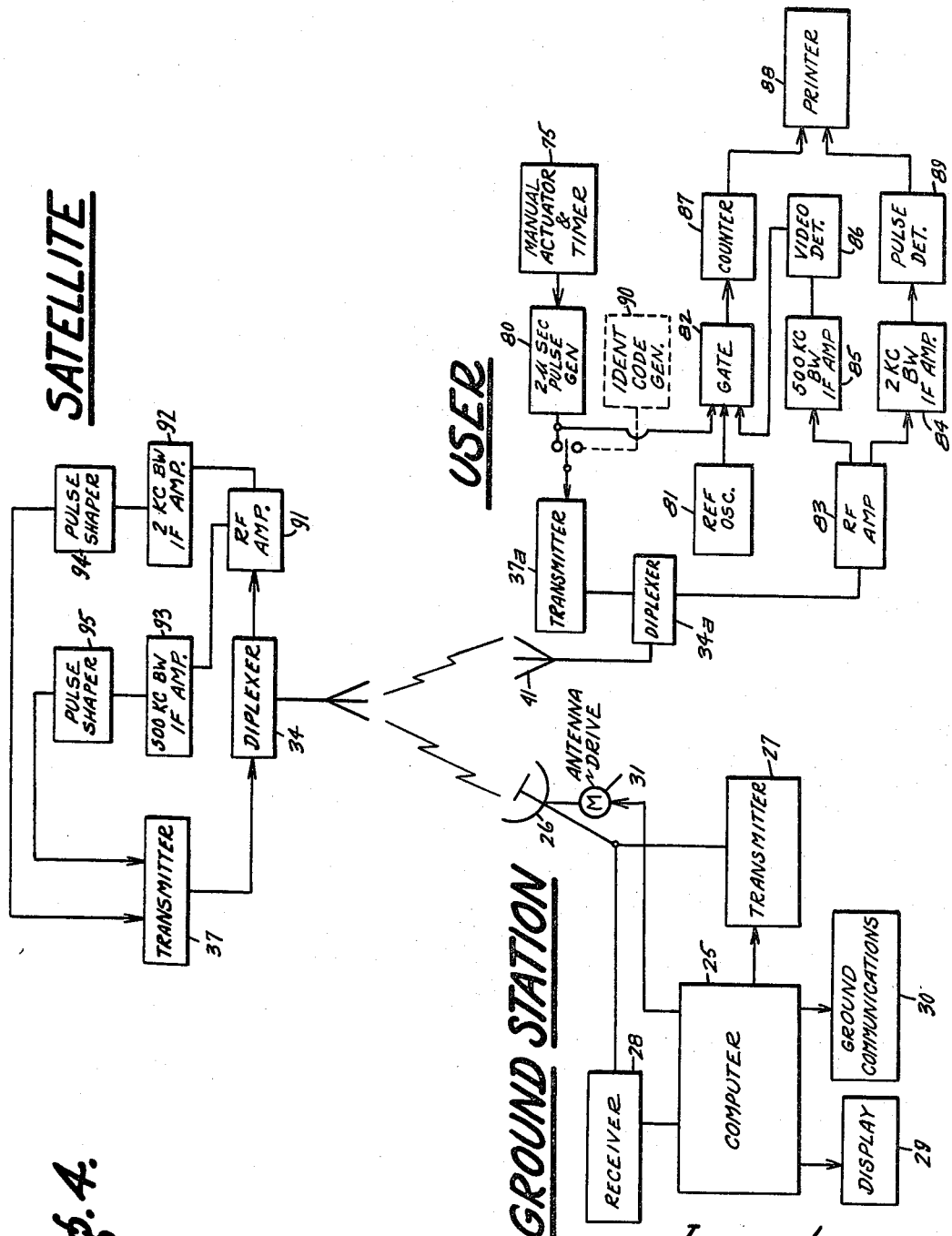

United States Patent Office 3,384,891
Patented May 21, 1968

3,384,891
METHOD AND SYSTEM FOR LONG DISTANCE NAVIGATION AND COMMUNICATION
Roy E. Anderson, Schenectady, N.Y., assignor to General Electric Company, a corporation of New York
Filed Feb. 11, 1965, Ser. No. 431,897
18 Claims. (Cl. 343—6.5)

My invention relates to a method and system for obtaining long distance navigation and communication by employing artificial earth satellites or aircraft, and in particular, to a method and system wherein range measurements are obtained between the satellites or aircraft and a craft whose position is to be located.

A number of methods and systems for long distance navigation utilizing one or more artificial satellites placed in orbits around the earth may be employed. A range rate measurement technique is one of the known methods for locating the position of a craft (aircraft or surface vessel) with respect to the earth. In the range rate system, the range rate of a satellite relative to the craft (hereinafter described as the user) having its position located is determined by measuring the Doppler shift of a continuous wave signal transmitted by the satellite. The Doppler shift is a phenomenon created by a frequency change of the continuous wave signal as observed by the user while receiving the signal for several minutes. There is a unique "Doppler curve" for every point within range of the satellite during its travel above the horizon and the user's position can thus be determined from the curve if the satellite orbit is known accurately. The major disadvantages of the range rate system are that the computation for determining the user location is complicated and the cost and complexity of computing equipment is high if the location is to be determined in a short time with good accuracy. Other disadvantages are that the time required for satellite observation and position computation as well as the motion of a user aircraft during the period of observation makes this method cumbersome for aircraft use; an extended period of time of satellite observation must be employed in order to obtain sufficient information for position determination if useful accuracy is to be achieved; the cost of user equipment is relatively high even if the burden of position computation is transferred to a ground station computer since some processing of the received signal is necessary by the user; the range rate technique is not well adapted to higher orbits and thus requires a large number of satellites and ground stations if full time, worldwide coverage is to be obtained; communication between users and ground stations requires a relatively large quantity of data to be transmitted from the user if computation is to be performed at the ground stations thereby requiring a more complex communication system.

Another known method for locating the position of a user with respect to the earth is an angle measurement technique either alone or in combination with a range measurement. The angle measurement at the user and/or satellite location requires a precise measurement of the azimuth angle and range, or the azimuth and elevation angles. The disadvantages of the angle measurement technique is that the necessary angle measurement accuracy is obtained with equipment such as precision radar tracking antennas that are very expensive and complex and thus not realistically suitable for user and satellite equipment considerations.

Other known navigation systems such as Doppler radar, inertial navigation and low frequency hyperbolic systems such as LORAN have certain advantages, but none of these affords any capability for communication since the data processing for position determination is done aboard the user craft. Navigation may be described as the science by which a person or vehicle is guided from one place to another safely and expeditiously, and therefore, other communication to the user in addition to mere position fixing may often be necessary. Thus, it is readily apparent that there is a need for developing a new long distance navigation-communication system which can accurately locate the position of a user with respect to the earth without the attendant disadvantages enumerated hereinabove.

Therefore, one of the principal objects of my invention is to develop a new and improved long distance navigation communication method and system employing orbiting earth satellites or other vehicles and associated ground stations.

Another important object of my invention is to develop the navigation-communication method and system wherein the satellites or vehicles receive and retransmit ranging-signals for obtaining the position of the user.

Still another important object of my invention is to develop a method and system for long distance navigation whereby the position of an aircraft or surface vessel may be determined within one half second of time and to an accuracy better than ± one nautical mile.

A still further object of my invention is to develop an active mode method and system for long distance navigation wherein the user craft transmits signals.

Another object of my invention is to develop a passive mode method and system for long distance navigation wherein the user craft does not transmit signals and thus does not reveal his position.

A further object of my invention is to develop a method and system for worldwide synchronization of clocks.

A still further object of my invention is to develop a method and system for long distance navigation employing the synchronized clocks.

Briefly stated, and in accordance with one aspect of my invention in meeting the objects enumerated above, my method for locating the position of a user craft with respect to the earth includes two operational modes, the first being an active mode that involves a transmitted response from each user's equipment when it is interrogated by an associated ground station through one or more satellites or upon initial transmission from the user, and a passive mode wherein no transmission is made by the user and his position is thus not made known to others. In the active mode, the ground station transmits ranging-signals to a satellite which, in turn, retransmits such signals to the user and the ground station. The user's equipment repeats the ranging-signals received from the satellite and retransmits them to the satellite which, in turn, retransmits them to the ground station. The ground station receives both the transmissions of the repeated ranging-signals from the satellite and measures the time interval therebetween and from this time interval computes the range from a known position of the satellite to the user. The same interrogation message is transmitted from the ground station to a second satellite at a different location and at a time that may be as small as milliseconds after the first interrogation or, alternatively, the same interrogation message is transmitted from the ground station to the same satellite at a later time to obtain two computed ranges from the user to two known positions of the satellite or satellites. The two range measurements using two different satellites or one satellite at two different times provides two circles of position that intersect at two points, one of which is the user's location.

In the passive mode of operation, the ground station transmits the positions of the two satellites separately and separated in time such that they are received without interference by all passive mode users in range of the satellites. Immediately following, the ground station transmits ranging-signals separately to each of the two satellites with anticipated propagation times such that the ranging-signals are repeated and retransmitted by the satellites substantially simultaneously with a time precision of approximately 0.1 microsecond. The user measures the time delay between his reception of the two retransmitted (repeated) ranging-signals and from this time delay calculates the range difference to the two satellites and thereby defines a hyperbolic surface having its foci at the satellite positions. The intersection of the hyperbolic surface with the earth plus the user's altitude above the earth defines a line of position for the user. The ground station repeats the procedure periodically using different pairs of satellites such that new lines of position may be obtained with frequencies sufficient to plot the user's path.

The range measurement navigation system includes one or more artificial earth satellites circuiting about the earth in accurately defined orbits. Each satellite is provided with a receiver and transmitter for repeating ranging-signals obtained by line-of-sight communication from a ground station or user. The user is also provided with a receiver and, in general, a transmitter for receiving the repeated ranging-signals transmitted by the satellite and for retransmitting such signals by line-of-sight communication to the satellite in the active mode of operation. The ground station is provided with means for accurately determining positions of the satellite at any particular time when in line-of-sight communication therewith. The ground station is further provided with a computer which has stored therein the known locations of the satellites at any particular time as determined from the accurately defined orbits. The computer is responsive to accurately known positions of the satellites and to the ranges from the known positions of the satellites to the user and is programmed to compute therefrom the position of the user with respect to the earth to an accuracy within ±one nautical mile and within one second's time from the initial signal transmission.

The features of my invention which I desire to protect herein are pointed out with particularity in the appended claims. The invention itself, however, both as to its organization and method of operation, together with further objects and advantages thereof may best be understood by reference to the following description taken in connection with the accompanying drawings, wherein like parts in each of the several figures are identified by the same reference character, and wherein:

FIGURE 4 is a simplified block diagram of a second embodiment of my navigation system.

Figure 1:
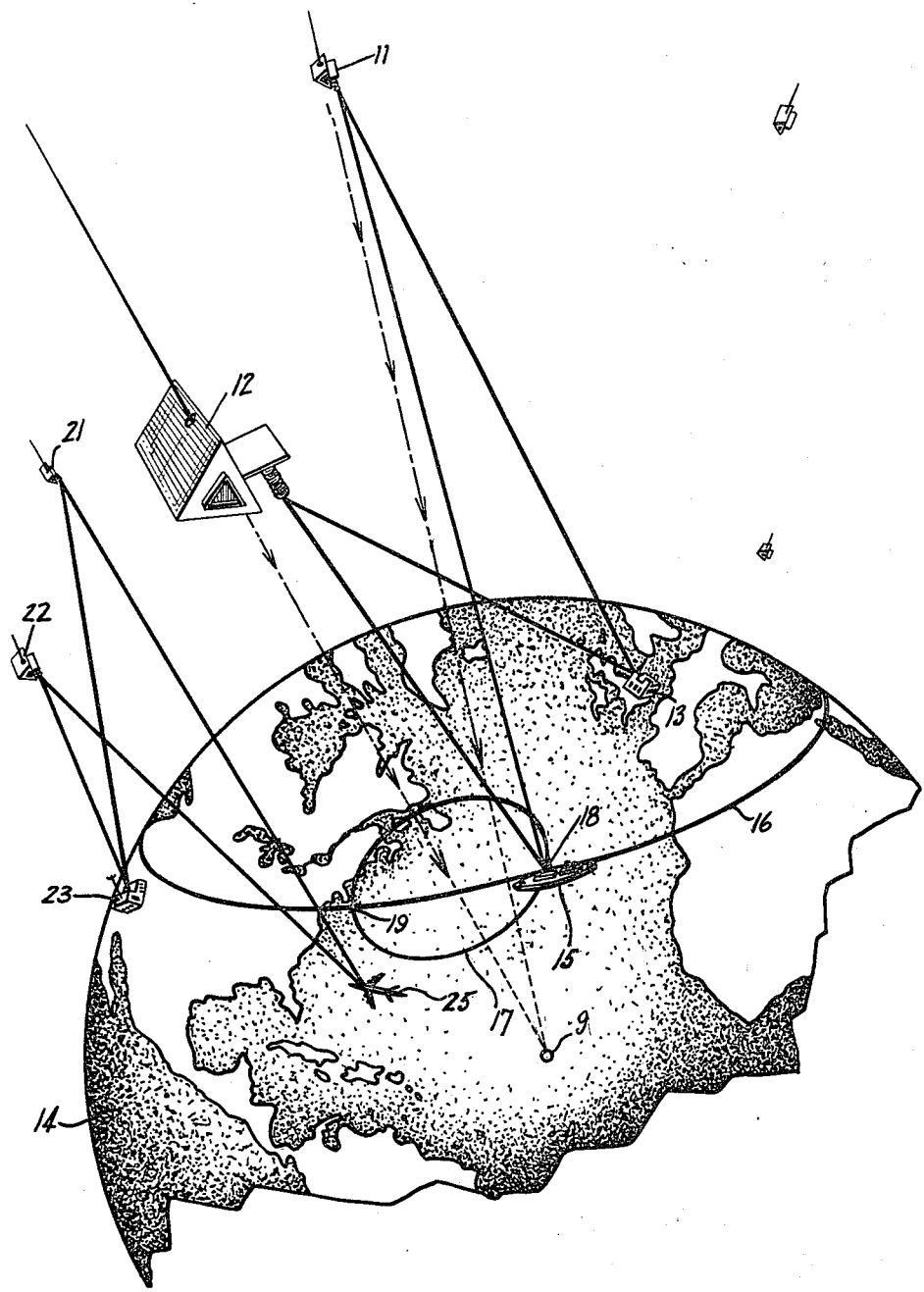
FIGURE 1 is a perspective view illustrating the transmission paths of the ranging-signals and two intersecting circles of position for a user which determine the position thereof in the active mode of operation of my invention.

Referring in particular to FIGURE 1, there is shown a navigation and communication system of the general type contemplated by my invention. The system, in general, comprises a plurality of widely spaced-apart vehicles which pass above the earth in paths which may be accurately determined. The vehicles may be satellites circuiting about or stationarily positioned with reference to the earth in accurately defined orbits or aircraft flying over predetermined routes. For purposes of simplification, the following description of the operation of my navigation communication system will refer to the vehicles as satellites although it should be understood that aircraft may also be employed in place thereof. The number of satellites employed is determined primarily by the desired earth coverage for the particular system. Thus for the case of a navigation-communication system limited to the North Atlantic Ocean area, a pair of widely spaced-apart satellites may be employed to provide the desired area coverage. Line-of-sight communication is employed in my system and the altitude of the satellites is therefore determined in part by the area of coverage and number of satellites employed. The altitude of the satellites may vary from slightly less than 500 miles to more than 10,000 miles, an altitude of 5600 miles being a choice which is a compromise determined by the particular capability of a selected booster rocket versus earth surface coverage obtainable from a satellite at a given altitude. For North Atlantic Ocean coverage, the satellites are preferably placed in synchronous orbits such that each satellite remains stationary with respect to a point on the surface of the earth directly below it. For worldwide (entire surface of the earth) coverage, a plurality of synchronous or non-synchronous satellites in inclined orbits may be employed, thus, 16 satellites comprising 4 satellites in each of four orbits whose ascending nodes are 90° apart assures redundant coverage of the entire earth surface in the case where the satellites are equally spaced in the four orbital planes with an inclination of 51°. In this first embodiment of my worldwide coverage system, aircraft and surface vessels anywhere on earth always have access to at least one pair of satellites for line-of-sight communication therewith. In a second embodiment of my worldwide coverage system, six satellites may be dispatched from each booster rocket which places the six satellites in one of the orbits such that the satellites have slightly different speeds so chosen as to minimize the effects of their possible eventual bunching. This second embodiment employing six satellites in each of the four orbits obtains a number of redundant satellites which provides a safety factor in case of failure of one or more of the satellites. Obviously, other orbital arrangements and different numbers of satellites may be employed and are deemed to be within the full intended scope of my invention.

A preferred embodiment of the satellite type employed in my invention will be described in greater detail hereinafter but suffice it to say for now that the satellites are of small size and light weight and each satellite is provided with a transmitter and receiver means for line-of-sight communication with a ground station and also for line-of-sight communication between the satellite and a user craft whose position is to be located with respect to the earth. The satellite orbits may be circular or non-circular, the preferred mode being circular for simplification of range and position calculations made by computers installed at each ground station.

The number of ground stations employed in my system is also determined by the earth surface coverage desired. Thus, for North Atlantic Ocean coverage only, one ground station which may be located in the northeastern United States is sufficient. Worldwide coverage with the 5600 nautical mile satellite system requires six ground stations approximately equally spaced about the earth. The relative positions of the stations must be accurately known in order to provide accurate navigation information to the user. Each ground station is provided with transmitter and receiver means for line-of-sight communication with the satellites within its area of coverage in any particular instant of time. Each ground station is further provided with means, such as repeated range measurements from ground station to satellite, to accurately determine the orbits and the locations of any satellite within its view. A tracking antenna is also employed at the ground station for directing the communication to and from the satellites and may also aid in determining satellite position. The ground station is also provided with a computer for calculating the orbits and locations of the satellites as well as the position of any user which employs the satellites within line-of-sight communication of that particular ground station.

The method of operation of my navigation-communication system in accordance with my invention will now be described with particular reference to FIGURE 1. A first pair of widely spaced-apart satellites 11, 12 are illustrated as being within line-of-sight communication with a ground station 13 located at the surface of the earth 14. The ground stations need not be located at the earth's surface and thus may be aboard a water vehicle or on aircraft, however, the preferred location for simplicity and accuracy of position calculation is an accurately known fixed land location. A user craft in need of navigation information from ground station 13 is illustrated as a water vehicle 15 having a location on the water surface such that it is in line-of-sight communication with each of satellites 11, 12 and out of line-of-sight communication with ground station 13. Communication employing digital pulse transmission techniques will be described hereinafter although it is to be appreciated that other known transmission techniques such as side-tone ranging, pulse compression, and pseudo-noise may also be employed and are within the scope of this invention. Each user of my system is assigned a unique digital address code in the digital pulse transmission embodiment of my invention. At a selected time which may be determined by the computer at ground station 13 or by user 15, ground station 13 transmits sequences of signals (pulses) to satellites 11, 12. The sequence of signals contains a satellite and user address code and several ranging-pulses. Assuming the first sequence of signals contains satellite 11 and user 15's address, satellite 11 automatically repeats user 15's address, its own address and the ranging-pulses. The user equipment automatically recognizes its own address and repeats the satellite address and ranging-pulses. The user repeated signals are thence received and repeated by satellite 11, and ground station 13 receives both retransmissions from satellite 11. The computer in ground station 13 is responsive to an accurately determined location, including altitude, of satellite 11 as obtained by the tracking antenna at ground station 13 and the measured time interval between transmission from and initial reception of the signals at the ground station. A measurement of the time interval between reception of the satellite-repeated ranging-pulses at the ground station determines the range from satellite 11 to user 15.

The sequence of transmissions from ground station-to-satellite-to-user and return which may be described as an interrogation of the user 15 through satellite 11 may be repeated as quickly as within a few milliseconds of the first interrogation by interrogating user 15 through satellite 12. By means of these two interrogations of user 15, range measurements to the user from two precisely known points in space are determined. Each range measurement determines a circle of position for the user that is the intersection of two imaginary spheres; one centered on the satellite and having a radius equal to the measured range, the other centered at the earth's center and having a radius equal to the earth's radius plus the altitude (if any) of the user. Thus, two range measurements to the user from two precisely known points in space determine two circles of position on an imaginary sphere centered at the earth's center and having a radius equal to the earth's radius plus the altitude of the user, wherein the two circles of position are the intersection of three imaginary spheres, two of them being centered on the two satellites and each having a radius equal to the measured range from the user to that particular satellite. Thus, in the case of water vehicle user 15, the imaginary sphere is the surface of the earth and the circle of position determined by the range from user 15 to satellite 11 is illustrated in FIGURE 1 as circle 16. The range from user 15 to satellite 12 determines circle 17, in each case the circles having centers determined by the point of intersection on the imaginary sphere of a straight line (shown with arrows) drawn from the satellite to the center 9 of the earth.

The two circles of position, in general, have two intersections 18, 19, one of these intersection points being the true position of the user and the other point an ambiguity. The two intersection points are usually sufficiently far apart such that a very approximate knowledge of the true position suffices to eliminate the incorrect intersection.

The position fixing hereinabove described employing two range measurements is effective in determining the position of the user with respect to the earth. Thus, in the case of an aircraft user, his position as to latitude and longitude is determined from two range measurements and his altitude is obtained by an external means. A complete position fix, including altitude, is obtained by interrogating three satellites to thereby obtain three range measurements to the user from three precisely known points in space. By this method, four intersecting imaginary spheres are determined and the position of the user is determined with respect to the positions in space of the three satellites and thus the three coordinates of position are also known with respect to the earth.

The computer is programmed to solve mathematical equations, which include known satellite positions including their altitude and the range measurements from satellites to craft, in a very short time and the resulting craft position information is thence transmitted to the user by means of one of satellites 11, 12 such that a position fix may be obtained in a total elapsed time of less than one second and with an accuracy of better than ± one nautical mile. The accuracy is, of course, determined by many factors including the carrier frequency of the digital pulse transmission.

FIGURE 1 also illustrates a second pair of widely spaced-apart satellites 21, 22 which are each within line-of-sight communication with a second ground station 23. A user, in this case an aircraft 25, is interrogated through satellite 21 and satellite 22 in sequence to determine range measurements to user 25 from the two precisely known points in space of satellites 21, 22. These two latter ranges determine two circles of position (not shown) on an imaginary plane concentric with the earth and having a radius equal to the earth's radius plus the altitude of aircraft 25. For most aircraft, an assumed altitude suffices to yield sufficient accuracy since the aircraft altitude merely causes an error in lateral position which is a fraction of the altitude error unless a satellite is virtually directly overhead of the user. If a higher degree of acuracy is needed, the altitude of user aircraft 25 may be transmitted from the aircraft to the ground station by means of a satellite at the time of interrogation, or the aircraft may be interrogated through three satellites in order to determine its position and altitude as herein above described.

The mehod for obtaining a position fix described hereinabove, which may be classed as an active mode, requires that the user disclose his position since there is a retransmission of the signals received by the user from the satellite. In order to provide a method by which the user need not reveal his position, a passive mode of range measurement operation may be employed. In this passive mode of operation, a ground station and a pair of satellites are employed. The passive mode is distinguished from the hereinabove descrived active mode which utilizes a ground station and a pair of satellites but may employ a ground station and only one satellite by employing the second interrogation of the user after a sufficiently long time interval whereby the one satellite has reached a significantly different position from that of the first interrogation. The passive mode utilizes a ground station and a pair of satellites. The passive mode of operation is as follows: The ground station transmission is programmed to provide short time blocks of transmission at sufficiently short time intervals where the transmission includes a general address code simultaneously (or precisely offset by a very short and accurately known time interval) to each of a pair of satellites within line-of-sight communication therewith. The time block of ground station transmission may be in the order of a quarter second and may be repeated at intervals in the order of 30 seconds. Following the general address code, the ground station transmits the positions (latitude, longitude and altitude) of the two satellites separately and separated in time sufficient such that they are received without interference by all passive mode users in range of the two satellites. Immediately following the transmission of the satellite position signals, the ground station transmits precisely timed signals (pulses) separately to each of the two satellites, anticipating the propagation times so that they are retransmitted by the satellites simultaneously with a time precision of approximately 0.1 microsecond. The user, being in line-of-sight communication with the pair of satellites, measures the time delay between his reception of the two precisely timed pulses and from this time delay calculates the range difference to the two known positions of the satellites and thus defines a hyperbolic surface having its foci at the satellite positions. The intersection of the hyperbolic surface and a sphere concentric with the earth and at a radius equal to the radius of the earth plus the user's altitude defines a line of position for the user. The ground station repeats the procedure periodically such as every 30 seconds or 1 minute using a different pair of satellites, or the same pair of satellites which have moved to other positions, to define the intersection of a second line of position for the user. If the user advances the first line of position along the user's path of travel for the period between measurements, a running fix of the user's position is thereby obtained. A position fix may be obtained with the passive mode of operation by employing two pairs of satellites substantially at the same time for obtaining two lines of position for the user having an intersection point, the user's position.

A simple calculation using a single passive mode observation can also be employed to provide an improved estimate of position from an assumed position such as might be obtained by dead reckoning.

The methods hereinabove described relate to range measurement techniques for locating the position of a craft with respect to the earth or with respect to positions in space of several satellites. The system of line-of-sight ground station-satellite-user position determination may also be employed for the communication of information other than position fixing. Thus, additional information useful for navigation purposes such as weather information may be transmitted from the ground station to the user by means of a satellite and two-way communication between ground station and user by way of the satellite may also be obtained by employing a suitable digital code therefor as one example. The interrogation of the user need not be initiated by the ground station, but may be initiated by the user. The advantage of initiation by the ground station is that time blocks for each particular user may be programmed in the ground station computer to provide orderly interrogations of many users. However, in certain cases such as an emergency, the user can initiate the interrogation by, for example, employing an emergency address code which causes the ground station to respond immediately thereto. The ground station response may be an immediate computation of the user's position and transmission thereof to the user and to other craft adjacent thereto, providing specific information and/or instruction to the user in distress and the adjacent craft, or other responses determined by the particular emergency.

The system of ground stations and orbiting satellites may also be used in a method for remote time synchronization whereby clocks throughout the world may be synchronized to an accuracy on the order of one microsecond. The positions of the ground stations, satellites and users are known accurately by means of the position fixing techniques hereinabove described such that the propagation path (total distance travelled by a radio frequency wave) is known. Propagation does not affect the path length delay excessively for this purpose. In the method of world-wide time synchronization, one of the ground stations is provided with an accurate clock, timed to a national time standard, and precisely timed radio frequency pulses are transmitted by the ground station in synchronism with the accurate clock to the satellites and thereby repeated to other ground stations, satellites and users. Since each ground station or user desiring to have its clock synchronized to the accurate clock knows his own position and that of any satellites and ground stations between itself and the accurate clock-ground station, a calculation of the path length for the propagated pulses obtains the propagation time, and knowing the time at which the pulses were originally transmitted and the travel time to the particular ground station or user, the clock at such user or ground station can be set to an accuracy within one microsecond of the national time standard.

The remote time synchronization method may also be employed in a method of navigation using synchronized clocks in a passive mode of operation. In this latter type of passive mode of operation, the user is provided with a clock having a high degree of stability, such as a cesium beam clock having a stability of $10^{11}$ or better whereby the user's clock, when set to the national time standard within one microsecond, maintains its accuracy for usefully long periods of time. The user clock is set to the national time standard when the user is at an accurately known position such as the point of departure of an aircraft at an airport. The user then can travel for relatively long periods of time using lines of position (obtained from one satellite) or position fixes (obtained from two satellites virtually simultaneously) as determined by time intervals between the time of transmission from a ground station of precisely timed pulses in synchronism with the accurate clock and time of reception by the user. The known positions of ground station and satellites, time of transmission and reception, determine the range from user to satellite. The synchronized clock method of navigation simplifies the passive mode of operation for position fix computation by substituting two simple range calculations for the hyperbolic calculation.

The system for accomplishing the methods of navigation and communication hereinabove described will now be disclosed in greater detail. All of the elements of the systems hereinafter described and illustrated in block diagram form in FIGURES 2, 3 and 4 are of conventional design and the details thereof will therefore not be considered but will be described, in general, by the characteristics or functions performed by the particular elements.

Figure 2:
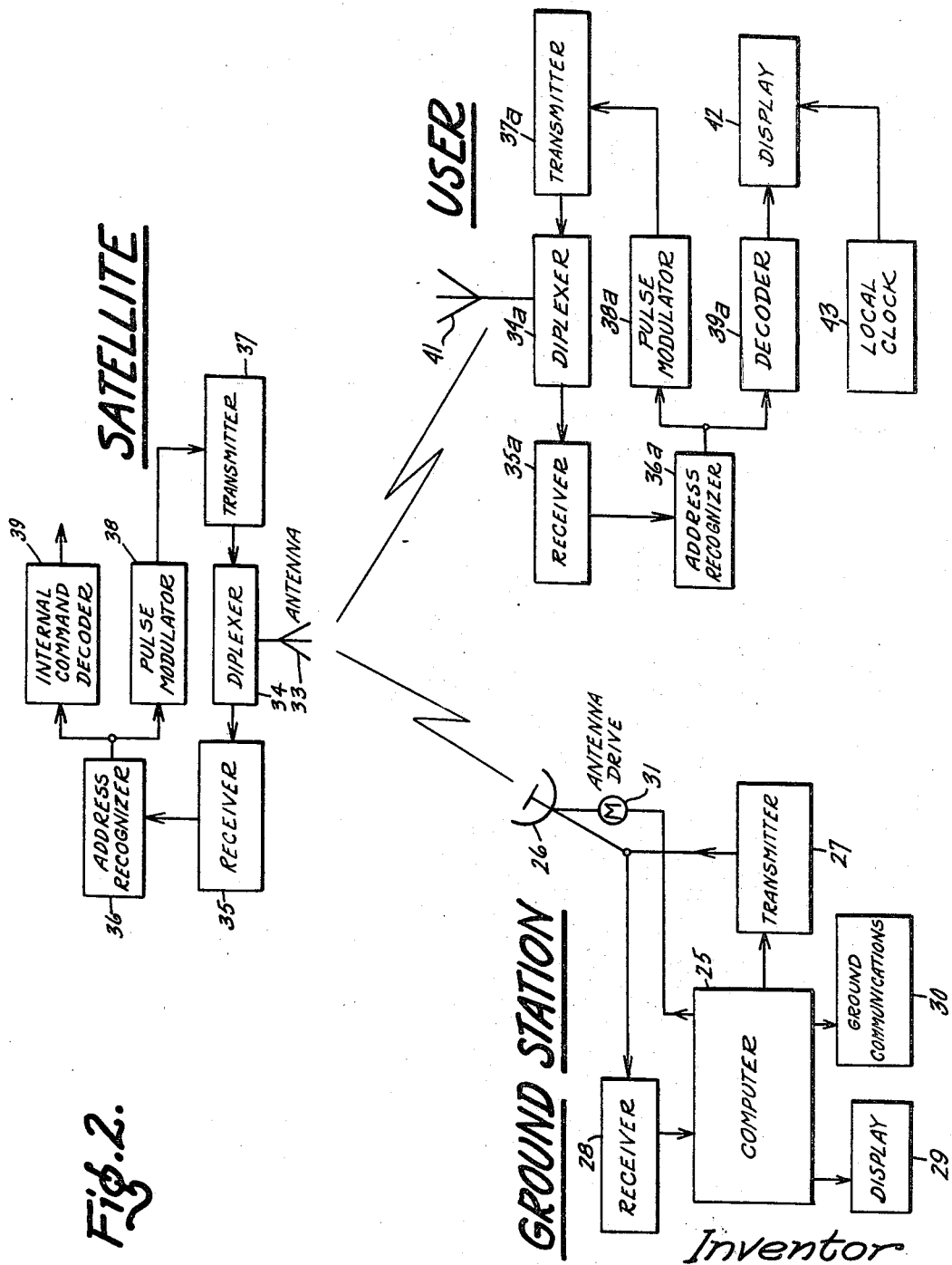
FIGURE 2 is a simplified block diagram illustrating the basic elements of a range measurement navigation system constructed in accordance with my invention.
Figure 3:
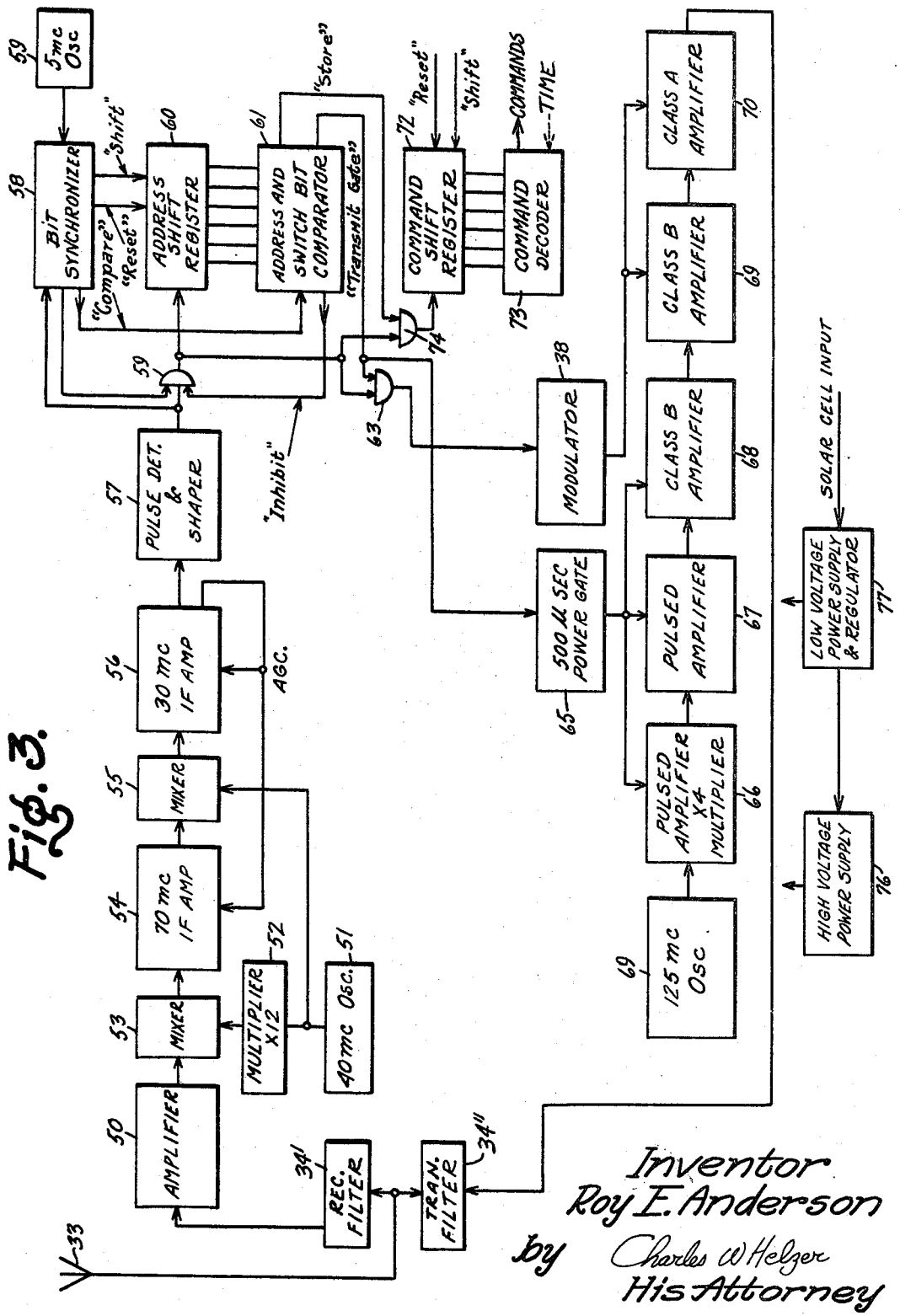
FIGURE 3 is a more detailed block diagram of the elements included within the repeater-satellite and user vehicle of FIGURE 2.

FIGURE 2 illustrates a simplified block diagram of the system constructed in accordance with my invention. The system may be conveniently divided into three parts, a ground station which generates the information and signals to be ultimately transmitted to the user, a satellite (or aircraft) which repeats the signals transmitted by the ground station, and a user which may be an aircraft or water vessel that desires to have navigation information provided from, and, or, communication with, the ground station.

The role of the cooperating ground station is extremely important in that the use of ground stations removes complexity from the user's equipment thereby permitting it to be inexpensive, simple and reliable. All of the computations in the active range measurement mode of operation are accomplished by a computer 25 located at the ground station and the system is therefore completely automatic for the user. The performance of all the computations at the ground station also removes complexity from the satellite equipment so that it too is reliable, relatively light in weight, and inexpensive. A further advantage of the ground stations results from the fact that user positions are computed at the ground stations and the positions of all users are there known whereby they can be used for air traffic control, navigation hazard warnings, home office knowledge of ship positions, sea-air rescue, data collection, and other functions that would not be possible if the system were designed only to enable navigators to determine their own positions. The data collection may be from remote manned or unmanned sensors such as oceanographic weather buoys.

The major elements of the ground station are the tracking antenna 26, radio equipment including transmitter 27 and receiver 28, and the data handling equipment including computer 25 with its peripheral equipment, recording and display equipment 29 and ground communications equipment 30. Suitable motor driven antenna drives 31 are employed for each antenna 26. Each ground station includes a number of antennas, receivers and transmitters since simultaneous contact with several satellites is sometimes necessary, the number varying, in general, from 4 to 8 depending upon the traffic load handled by that particular ground station. Pointing of the antennas is accomplished by programming antenna drive 31 from the computed satellite position data. Computer 25 is of the digital type of size determined by the traffic load handled by the particular ground station.

The position fixing accuracy of my system is a function of the satellites positions and errors therein, the radio frequency and bandwidth of operation, and the nature of the electronic equipment at the ground station, in the satellite and aboard the user craft. Accurate medium-altitude satellite positions (including altitude) are automatically determined by the computer from the range interrogation of the user craft via the satellites. For these medium-altitude satellites, the ranges from the ground station to satellite are obtained from a number of ground stations whose positions are accurately known. The ground station to satellite ranges are used in an appropriate computer program to produce accurate orbital data. A reasonable extrapolation by present day techniques permits real-time position of these satellites to within ±100 feet and the position of synchronous satellites to less than ±50 feet.

The radio frequency employed in my systems is not limited to any particular frequency or several frequencies but is operable at any frequency within the range from below 50 megacycles per second to above 10,000 megacycles per second. The choice of radio frequency operation is, however, important since the range measurement error due to ionospheric phase delay increases with decreasing frequency while antenna and circuit problems generally become more severe at higher frequencies. Operation in the UHF band at approximately 500 megacycles presents a good compromise for minimizing the range measurement error due to ionospheric phase delay and minimizing antenna and circuit problems. Transmitter 27, receiver 28, antenna 26 and the antennas, receivers and transmitters in the satellites and user craft are each designed for a bandwidth operation of approximately one megacycle which is sufficient to convey the necessary information using digital pulse transmission techniques at a carrier frequency of 500 megacycles per second. Operation in the VHF band at approximately 125 megacycles and a bandwidth of 50 kilocycles is valuable for present-day aircraft operation although it may have the limitation of increasing the position fix inaccuracies to ±3 to 5 miles.

As stated hereinabove, the altitude and orbit of the various satellites determines the ground coverage obtained from each satellite and thus the number of satellites necessary to obtain a desired ground coverage for the system. The use of aircraft in place of the satellites obviously limits the ground coverage per aircraft due to the much lower altitude of each aircraft, but finds application in some areas.

An example and use of this nonorbital (aircraft) version of my navigation satellite system hereinabove described is as follows: A master ground station provided with a computer, and several unmanned ground stations equipped with transponders are each located in spaced-apart relationship at accurately known positions. A reference aircraft in line-of-sight communication with the ground station has its position and altitude accurately computed at the master ground station by a trilateration technique employing ranging-pulses transmitted to the aircraft, and repeated by the aircraft and each of two of the unmanned ground stations in line-of-sight communication with the aircraft. Range measurements from the two unmanned ground stations to the aircraft, and from the aircraft to the master ground station are obtained by measuring the time intervals between transmission and reception of the ranging-pulses at the master ground station in the same manner as described with reference to the satellites. Range measurements obtained from two unmanned ground stations in a time interval sufficiently short such that the aircraft has moved a negligible distance in this interval permits computation of a highly accurate position fix for the aircraft. The messages transmitted from the master ground station include the aircraft address code and unmanned ground station address codes as well as the ranging-pulses. Once the position of the reference aircraft is accurately known, the master ground station transmits messages which include the reference aircraft address code and user address code in addition to ranging-pulses. The users being in line-of-sight communication with the reference aircraft, and out-of-sight communication with the master ground station, are also equipped with transponders and automatically repeat their own address and ranging-pulses when interrogated by the master ground station through one or more reference aircraft having accurately known positions. The position of the users is accurately determined at the master ground station by employing the range measurements obtained in the manner previously described.

An advantage of the nonorbital (aircraft) system is that the system is considerably reduced in cost since the appreciable cost of launching a satellite is eliminated. Further, the shorter ranges involved permits the use of wider bandwidth transmission to permit position fixing of a great number of users in a very short time interval. For example, the position of 100 users may be determined within a one minute time interval. Finally, the use of specific user address codes, in the same manner as described with reference to the satellites, permits positive identification of each user.

Each of the satellites may weight in the order of 100–150 pounds and is provided with a passive attitude control employing gravity gradient stabilization which makes possible the use of earth oriented satellite antennas with sufficient gain to obtain an antenna beam of width to cover only the visible earth from the satellite and an additional width to account for possible alignment error of the satellite and antenna pattern. An antenna of such gain permits very little loss of the radiated power into space whereby the system becomes relatively independent of altitude. A yaw control may be employed to maintain the satellite pointed toward the sun to increase the efficiency of the photovoltaic cells which provide the electrical energy to the electrical equipment aboard each satellite. The passive attitude control utilizes the natural force fields available in space, has long life reliability due to its inherent simplicity and provides a considerable weight advantage over active attitude control systems with comparable performance. The antenna used in conjunction with the passive attitude control is a circularly polarized helical antenna 33.

Signals received at the satellite from the ground station are applied through diplexer 34 to a receiver 35. The digital messages which provide the navigation information and communication in my system may be transmitted as a sequence of pulses in one embodiment of my invention. As one example of a message format employed for range interrogation of a user craft, pulses one microsecond in length may be employed. A digital "one" is transmitted as a pulse and a digital "zero" is the absence of a pulse. The term "bit" will refer to either a "one" or a "zero." A bit rate of "one bit" per five microseconds may be employed and as an example, a range interrogation message transmitted from the ground station to the satellite may comprise the following.

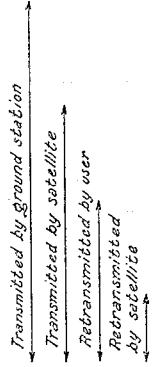

| | |
|---|---|
| Bit Synchronization | 3 "ones" |
| Satellite Address | 6 bits |
| Switch Command | 1 bit |
| Bit Synchronization | 3 "ones" |
| User Address | 20 bits |
| Switch Command | 1 bit |
| Bit Synchronization | 3 "ones" |
| Satellite Address | 6 bits |
| Switch Command | 1 bit |
| Bit Synchronization | 3 "ones" |
| Ground Station Address | 4 bits |

The first three pulses in the message (bit synchronization) synchronize a clock pulse generator in the satellite with the received pulse phase so that the satellite is capable of receiving the remainder of the message correctly. The satellite address that follows the first three synchronizing pulses is compared in an address recognizer 36 with two stored addresses, one of which is unique for that specific satellite and the other an address common for all satellites. In the case wherein the received address is different from either of the stored addresses, the satellite ignores all received pulses for the next 500 microseconds. The 500 microsecond blanking time is used to avoid a retransmission of a sequence of pulses within a message intended for another satellite. In the case wherein the received address agrees with either of the two stored addresses, the next pulse (switch command) causes a switch in the address recognizer 36 to operate. In one position of this switch all pulses arriving at the satellite during the next 500 microseconds are directed to a pulse modulator 38 of transmitter 37 to cause immediate retransmission of the pulses following the first switch command pulse. In the other switch position, the pulses during the next 500 microseconds are directed internally to a command decoder 39 and appropriate commands are thence initiated within the satellite such as to turn-on or turn-off power to the various electronic tubes in the pulse modulator 38 and transmitter 37 circuits, or to actuate a diagnostic telemetry system.

The user's equipment is very similar to that of the satellite except for a simplified antenna. The antenna 41 may be very simple for obtaining moderate position fix accuracies in the order of ± one nautical mile. For water craft and small aircraft, a quarter wave vertical stub may be used and for high speed aircraft, a flush mounted annular slot antenna is sufficient. The remaining essential user equipment comprises diplexer 34a, receiver 35a, address recognizer 36a, transmitter 37a, and pulse modulator 38a. The simplest user equipment is the transponder hereinabove described comprising elements 34a through 38a whereby the user's position is made known at the ground station but without a display of the user's position aboard the user craft. This simplest of user equipment is useful for traffic integration and control and for air-sea rescue. A simple display 42 showing the user's latitude, longitude, and altitude in the case of aircraft, and the time at which the position fix was determined may be employed, if desired. The display may be a temporary visual indication such as on digital display lamps or a printout to obtain a permanent record of position fixes and time. In addition, the display may include capability of printing information such as air traffic control messages and navigation or emergency advisories received from the ground station through the satellites. A local reference clock 43 supplies a known time of reception of signals to display 42.

The message transmitted from the ground station for range interrogation of a user craft is retransmitted by the satellite starting with the second set of bit synchronization pulses. The second set of bit synchronization pulses arrive at the user craft and are used to synchronize a clock pulse generator on the user craft with the received pulse phase so that the user is capable of receiving the remaining of the digital message correctly. The following 20 pulses comprising a user address code are then compared with the stored specific user and common user addresses in address recognizer 36a. In the case wherein the received user address does not agree with either stored address, the user ignores all the pulses received for the following 500 microseconds. If the received user address agrees with one of the two stored addresses, the following pulse (the second switch command) operates a switch in address recognized 36a which causes all of the subsequent pulses to be directed internally to a readout and display 42 by way of decoder 39a in one position thereof, and to be directed to pulse modulator 38a for retransmission of the following pulses for position fix interrogation in the other position. The user craft retransmissions start with the third set of bit synchronization pulses. Aircraft users may add their altitude in digital form after the ground station address, if desired, for improved accuracy.

Upon reception at the satellite of the third set of bit synchronization pulses, the second satellite address and the third switch command pulses perform the same function as described hereinabove. The message then retransmitted by this satellite thus contains three bit synchronization pulses and the ground station address. The four "one" bit pulses in the ground station address serve as a sequence of ranging pulses, followed by aircraft altitude information or other data. Since the satellite and user equipments are activated for reception or retransmission for 500 microseconds after recognition of the address code, additional information such as traffic control and advisory information including navigation hazard warnings and weather may be included with the range interrogation or position fix display messages.

Emergency messages are initiated by the user craft, either by manual or automatic operation of the user's equipment. Such messages are accepted by the system immediately at any time and take priority over all other system functions. The simplest and least expensive user equipment for obtaining an emergency mode of operation includes a pulse code generator to generate common satellite and common ground station addresses, followed by the user's address code and an emergency alarm code. When received at the ground station, the alarm code stops all normal operations immediately and the ground stations that receive the emergency code interrogate the user in turn according to previously established procedure. Immediate interrogation of the user craft and display of his current position and time acknowledges to the user that his emergency message was received and his emergency condition and position are known at the ground station.

A more detailed block diagram of an exemplary transponder employed in the satellite or user is illustrated in FIGURE 3 and will be described with reference to the satellite. The received signal is directed by a three section input filter 34', which forms part of the diplexer system 34 in FIGURE 2, to a low noise tunnel diode amplifier circuit 50. For a received carrier frequency of 550 megacycles, a local oscillator comprising a 40 megacycle crystal controlled oscillator 51 and a multiplier 52 which multiplies the 40 megacycle signal to a frequency of 480 megacycles is employed. The received carrier frequency signals and local oscillator frequency is combined in a mixer stage 53 to produce a 70 megacycle intermediate frequency (IF). A 70 megacycle IF amplifier stage 54 is employed to amplify the signal and a second mixer stage 55 is supplied with the 70 megacycle IF signal and the 40 megacycle output of oscillator 51 to produce a 30 megacycle IF frequency signal which is amplified by a second stage 56 of IF amplification. The two IF amplification stages 54, 56 are each stabilized in gain under no-signal conditions by an automatic gain control (AGC) system referenced to the receiver noise output. The output of amplifier 56 is a pulse code amplitude modulated signal and is envelope detected by pulse detector and shaper circuit 57. The output of the pulse detector is supplied to a clock pulse generator circuit which includes bit synchronizer 58 and a five megacycle oscillator 59. The first five-megacycle synchonizing pulse to coincide with a received bit level which is substantially above the receiver noise is selected as the initial bit synchronization pulse. The next two bit synchronization pulses, spaced 25 synchronizing pulses apart (5 microseconds) are similarly compared. If the three synchronizing bits are properly recognized, the bit synchronizer 58 actuates a gate 59 preceding address shift register 60 and also provides 7 "shift" pulses to that register and a "compare" pulse to an address comparator which forms part of address and switch bit comparator 61. If either the specific or general address in address shift register 60 is recognized, the address and switch bit comparator 61 evaluates the switch command bit. If neither address is recognized, a 500 microsecond inhibiting pulse is applied to gate 59 to eliminate any possibility of the following 30 pulses being mistaken for the satellite address. If the specific or general address is recognized, and if the switch command bit is a "zero," the remainder of the message is directed to a hard tube modulator 38 by means of a 500 microsecond transmit gate 63. A 500 microsecond "transmit gate" pulse which operates transmit gate 63 also applies power to the first three transmitter-amplifier stages 66, 67, 68 for the entire 500 microsecond transmit period through a 500 microsecond power gate 65. A transmitter carrier frequency of 500 megacycles, as distinguished from the received signal carrier frequency of 550 megacycles, is generated from a continuously running 125 megacycle crystal controlled reference oscillator 69 having its output connected to a transistor amplifier-multiplier circuit 66. The transistor amplifier portion of circuit 66 is operated with power applied only during the 500 microsecond transmit interval to reduce power supply drain and minimize transistor heating. The following amplifier stage 67 is a transistor power amplifier utilizing two transistors also operated intermittently, that is, in a pulsed mode. A stage of vacuum tube amplification 68 which may be a class B tetrode amplifier, is employed for amplifying the 500 microsecond transmit time interval of the 500 megacycle pulses to a power level of approximately 200 watts peak power. The 500 megacycle signal is then amplified during the "one bit" times by a screen grid pulsed class B tetrode amplifier 69 and by a final stage comprising a class A, screen grid modulated tetrode amplifier 70. Wave shaping of the screen grid pulse is used to control the transmitter pulse shape to avoid the use of excess transmit filters, conventionally employed to isolate the receiver from the transmitter output, at the relatively high peak power of the transmitter pulses which is approximately 30 kilowatts. A single section filter 34" forming part of diplexer arrangement 34 is used to suppress transmitter harmonics and reflect received energy back to the receiver portion of the circuit.

If the switch command bit is evaluated as a "one" in address and switch bit comparator 61, the satellite received message is designated as command information and a "store" pulse is generated for operating gate 74 to direct the command information to command shift register 72 where the information is subsequently compared to stored command formats. Reset and shift pulses generated by bit synchronizer 58 and supplied to address shift register 60 are also supplied to command shift register 72. If the received command information is recognized in command shift register 72, the output of the shift register supplies the coded command to command decoder 73 and the appropriate command signals are generated thereby. These command signals may be, by way of example only, to turn-on or turn-off heater power to the modulator and amplifiers, or to actuate a diagnostic telemetry system. In the case of the user, signals from the local reference clock 43 (in FIGURE 2) provide an input to command decoder 73 which in such instance forms the display and readout.

The power supply for the satellite is an arrangement of solar cells for operating a high voltage power supply 76 (for the transmitter) and a low voltage power supply and regulator (for the receiver and all filaments).

A second embodiment of my long distance navigation system is shown in FIGURE 4. In this embodiment, the simplest operation of the system is as follows: The navigator in the user craft operates a manual actuator 75 such as a pushbutton at the time he desires a position fix. The operation of actuator 75 causes a 2 microsecond pulse generator 80 to transmit a 2 microsecond ranging-pulse which has a bandwidth in the order of 500 kilocycles as an example. The transmission time is noted by a timer associated with the manual actuator. The transmission of the pulse also opens a gate 82 from a reference oscillator 81 to counter 87, thereby permitting the counter to count the pulses or cycles generated by such oscillator. The 2 microsecond pulse transmitted by line-of-sight communication is received by the satellite and repeated thereby for retransmission back to the user. In particular, the 2 microsecond ranging-pulse is passed through a radio frequency amplifier 91, a 500 kilocycle bandwidth IF amplifier 93 and pulse shaper circuit 95 to the transmitter 37. The user then receives the repeated ranging-pulse which passes through a radio frequency amplifier 83, a 500 kilocycle bandwidth IF amplifier 85, and video detector 86 to close gate 82 from oscillator 81 to counter 87. The counter 87 then operates a read-out printer 88 which determines the range from user to satellite as a function of the time interval between transmission of the pulse from the user and reception of the repeated pulse.

The 2 microsecond pulse repeated by the satellite is also received at the ground station. The reception of this pulse at the ground station causes the ground station to transmit a 2 kilocycle bandwidth signal describing the satellite position, including altitude, to the satellite. The satellite, in turn, receives and retransmits this satellite position data, the received data passing through the radio frequency amplifier 91, 2 kilocycle bandwidth IF amplifier 92 and pulse shaper circuit 94. The satellite position data is received at the user and passes through the radio frequency amplifier 83, 2 kilocycle bandwidth IF amplifier 84 and pulse detector 89 and is then printed out on printer 88. The navigator uses simple charts and tables to determine a line of position of his craft. The sequence of operation of actuator 75 through the print out of satellite position data on printer 88 is automatically repeated in 15 to 30 seconds to determine a second line of position. The user craft navigator advances the first line of position along his known dead reckoning track to the second line of position and therefrom determines his position fix.

In the event that the user wishes to identify himself to the ground station, an identification code generator 90 may be employed by the user and a suitable identification code, such as the digital user address code previously described, may be employed.

The user may also be provided with means to automatically retransmit the 2 microsecond pulse upon receipt thereof from the satellite. Under this condition, the ground station receives the user-retransmitted pulse by way of the satellite and, from the measured time interval between the two receptions at the ground station, obtains a measure of the range from user to satellite, the position and altitude of the satellite being previously accurately known. Thus, the ground station computes the user position and transmits such computed position to the user via the satellite.

It can be appreciated that the second embodiment of my invention shown in FIGURE 4 is distinguished from the first embodiment in FIGURES 2 and 3 both structurally and in the method employed for obtaining position fixes. The type of signals transmitted is also different in both embodiments, the first embodiment employing pulses or bits of equal bandwidth and the second embodiment employing relatively wide bandwidth pulses for range measurements, to assure sharpness of the pulse leading edges, and relatively narrow bandwidth pulses for the satellite position data transmitted from the ground station.

From the foregoing description, it can be appreciated that my invention makes available a new method for long distance navigation which is also suitable for general communication purposes. My navigation method employs orbiting earth satellites or other vehicles such as aircraft and associated ground stations for obtaining line-of-sight range measurements to a user craft desiring to have its position fixed. The vehicles act as signal-repeaters, having accurately known positions, for the messages transmitted between the user and ground station. Since the vehicles may have their positions known to an accuracy of ±100 feet, a user position fix accuracy of ±1 mile is readily obtained using UHF transmission. The user position fix may be determined within one half second of time thereby providing a method for controlling navigation of a great number of user craft from a single ground station. The line-of-sight communication employed provides navigation information to user craft within thousands of miles from a ground station depending upon the position of the satellites. The navigation information may be obtained by the user in an active mode or passive mode of operation, the latter mode permitting the user to not disclose his position, but also requiring him to perform the position fix computation. My navigation method may also be extended to a method for remotely synchronizing clocks to a high degree of accuracy. The method employed for remote clock synchronization is also adapted to a method of navigation employing the synchronized clocks.

Having described several methods of navigation and a method for remote synchronization of clocks, and systems for carrying out these methods, it is believed obvious that modification and variation of my invention is possible in the light of the above teachings. Thus, position fix accuracies in the order of ±0.1 mile may be achieved by employing conventional, but necessarily more expensive, higher accuracy elements such as higher gain antennas to improve signal-to-noise ratio, by more accurate measurement of the range interval, by selection of the most favorable portions of the satellites' coverage area, by minimizing propagation errors and by averaging a number of fixes to reduce random errors. Higher carrier frequency and wider bandwidth pulses also obtain a higher accuracy fix position system.

It is, therefore, to be understood that changes may be made in the particular embodiments as described which are within the full intended scope of my invention and defined by the following claims.

What I claim as new and desire to secure by Letters Patent of the United States is:

1. A method for locating the positon of a craft with respect to the earth comprising the steps of
placing a vehicle provided with a receiver and transmitter in a path above the earth which may be accurately determined,
transmitting ranging-signals by line-of-sight communication from a ground station located substantially at the surface of the earth to the vehicle at a known position thereof,
receiving the ranging-signals and automatically retransmitting the received signals simultaneously from the vehicle back to the ground station and by line-of-sight communication to a craft whose position is to be located with respect to the earth,
receiving the retransmitted ranging-signals at the ground station and at the craft and automatically retransmitting the received signals from the craft back to the vehicle,
receiving the craft-retransmitted ranging-signals at the vehicle and automatically retransmitting such signals from the vehicle back to the ground station,
measuring the time interval at the ground station between the reception of the vehicle's two retransmissions of the ranging-signals whereby the range from the known position of the vehicle to the craft may be determined,
repeating the step of transmitting ranging-signals from the ground station to the vehicle at a time subsequent to the earlier transmission such that the vehicle is at a second known position considerably removed from the earlier known position and repeating the steps of receiving and retransmitting the subsequent transmission at the vehicle and craft whereby a measurement of the time interval at the ground station between reception of the vehicle's two retransmissions of the subsequently transmitted ranging-signals determines the range from the second known position of the vehicle to the craft, and
locating the position of the craft by employing the two determined ranges from the two known positions of the vehicle to the craft to describe two circles of position that intersect at two points, one of which is the craft's position.

2. The method set forth in claim 1 and further comprising the steps of
automatically computing the position of the craft at the ground station from the two determined ranges,
transmitting the computed position of the craft from the ground station to the vehicle, and
receiving the craft-computed position at the vehicle and automatically retransmitting the computed position to the craft.

3. The method set forth in claim 2 and further comprising the step of
transmitting additional navigation information other than the craft position from the ground station to the craft by way of the vehicle.

4. The method set forth in claim 1 and further comprising the step of
transmitting emergency signals from the craft to the vehicle and thence to the ground station whereby the steps for determining the position of the craft are initiated by the emergency signal transmission.

5. A method for locating the position of a craft with respect to the earth comprising the steps of
placing a vehicle provided with a receiver and transmitter in a path above the earth which may be accurately determined,
transmitting ranging-signals by line-of-sight communication from a craft whose position is to be located with respect to the earth to the vehicle,
receiving the ranging-signals and automatically retransmitting the received signals simultaneously from the vehicle back to the craft and by line-of-sight communication to a ground station located substantially at the surface of the earth and at an accurately known postiion thereof,
receiving the retransmitted ranging-signals at the craft,
receiving the vehicle retransmitted ranging-signals at the ground station and automatically transmitting signals describing the known position of the vehicle from the ground station to the vehicle, receiving the vehicle-position signals at the vehicle and automatically retransmitting these signals to the craft, measuring the time interval at the craft between transmission to and reception of the ranging-signals from the vehicle whereby the range from the vehicle to the craft may be determined knowing the known location of the vehicle, repeating the step of transmitting ranging-signals from the craft to the vehicle at a time subsequent to the earlier transmission such that the vehicle is at a second position considerably removed from the earlier position and repeating the steps of receiving and retransmitting the subsequent ranging-signals at the vehicle, and receiving, transmitting and retransmitting signals describing the subsequent known position of the vehicle whereby a measurement of the time interval at the craft between transmission and reception of the subsequently transmitted ranging-signals determines the range from the second known position of the vehicle to the craft, and locating the position of the craft by employing the two determined ranges from the two known positions of the vehicle to the craft to describe two circles of position that intersects at two points, one of which is the craft's position.

6. A method for locating the position of a craft with respect to the earth comprising the steps of placing at least two satellites each provided with a receiver and transmitter into accurately defined orbits above the earth, whereby the satellites are in a predetermined and widely spaced-apart relationship, transmitting ranging-signals by line-of-sight communication from a ground station located substantially at the surface of the earth to the satellites at known positions thereof, receiving the ranging-signals and automatically retransmitting the received signals simultaneously from the satellites back to the ground station and by line-of-sight communication to a craft whose position is to be located with respect to the earth, receiving the retransmitted ranging-signals at the ground station and at the craft and automatically retransmitting the received signals from the craft back to the satellites, receiving the craft-retransmitted ranging-signals at the satellites and automatically retransmitting such signals from the satellites back to the ground station, measuring the time interval at the ground station between reception of the two retransmissions of the ranging-signals from a first of a pair of satellites whereby the range from the known position of the first satellite to the craft may be determined, measuring the time interval at the ground station between reception of the two retransmissions of the ranging-signals from a second of the pair of satellites whereby the range from the known position of the second satellite to the craft may be determined and the two ranges from satellites to craft determine the craft's position.

7. A method for locating the position of a craft with respect to the earth comprising the steps of placing at least two satellites each provided with a receiver and transmitter into orbits about the earth which may be accurately determined, transmitting ranging-signals by line-of-sight communication from a ground station located at a known position on the earth to a first of a pair of the satellites at a known position therefor during a first time interval, receiving the ranging-signals and automatically retransmitting the received signals simultaneously from the first satellite back to the ground station and by line-of-sight communication to a craft whose position is to be located with respect to the earth, receiving the retransmitted ranging-signals at the ground station and at the craft and automatically retransmitting the received signals from the craft back to the first satellite, receiving the craft-retransmitted ranging-signals at the first satellite and automatically retransmitting such signals from the first satellite back to the ground station, measuring the time interval at the ground station between reception of the two retransmissions of the signals from the first satellite whereby the range from the known position of the first satellite to the craft may be determined, transmitting ranging-signals by line-of-sight communication from the ground station to a second of the pair of satellites at a known position thereof during a second time interval occurring subsequent to the first time interval, wherein the craft has not moved significantly between the two time intervals, receiving the latter ranging-signals and automatically retransmitting the latter received signals simultaneously from the second satellite back to the ground station and by line-of-sight communication to the craft, receiving the retransmitted latter ranging-signals at the ground station and at the craft and automatically retransmitting the latter received signals from the craft back to the second satellite, receiving the craft-retransmitted latter ranging-signals at the second satellite and automatically retransmitting such signals from the second satellite back to the ground station, measuring the time interval at the ground station between reception of the latter signals from the second satellite whereby the range from the known position of the second satellite to the craft may be determined, and the position of the craft determined from the two ranges from the pair of satellites to the craft.

8. A method for locating the position of a craft with respect to the earth in the absence of any transmission from the craft comprising the steps of placing at least two satellites each provided with a receiver and transmitter into orbits about the earth which may be accurately determined whereby the satellite positions may be accurately known at any instant of time, transmitting first signals comprising an accurately known position of a first of a pair of the satellites and precisely timed pulses by line-of-sight communication from a ground station located at a known position on the earth to the first satellite during a first time interval, receiving the first signals and automatically retransmitting the received signals from the first satellite by line-of-sight communication to a craft whose position is to be located with respect to the earth, receiving the retransmitted first signals at the craft, transmitting second signals comprising an accurately known position of a second of the pair of satellites and precisely timed pulses by line-of-sight communication from the ground station to the second satellite during a second time interval subsequent to the first time interval, the first and second time intervals determined such that the precisely timed pulses of the first and second signals are retransmitted respectively by the first and second satellites at accurately predetermined times with respect to each other, receiving the second signals and automatically retransmitting the received second signals from the second satellite by line-of-sight communication to the craft, receiving the retransmitted second signals at the craft, and measuring the time interval at the craft between the reception of the precisely time pulses from the first and second satellites whereby the range difference from the craft to the two satellites defines a hyperbolic surface having its foci at the satellite positions from which the position of the craft may be determined in the absence of any transmission from the craft.

9. A method for locating the position of a craft, comprising the steps of providing the craft with a clock having a high degree of stability synchronized to a national time standard at a known position of the craft such as at its point of departure, placing a satellite provided with a receiver and transmitter into a particular orbit about the earth whereby the satellite position may be accurately known at selected instants of time, locating a ground station provided with a receiver and transmitter at an accurately known position on the surface of the earth, transmitting precisely timed signals synchronized to the national time standard from the ground station having an accurately known position by line-of-sight communication to the satellite having an accurately known position, receiving the precisely timed signals at the satellite and automatically retransmitting such signals from the satellite to the craft, and receiving the retransmitted signals at the craft whereby the range from the craft to the satellite may be determined from the known transmission times of the signals from the ground station, the known ground station position, known satellite position and time of reception of the signals at the craft, repeating the steps of transmitting the precisely timed signals to a satellite at a second accurately known position, and receiving the latter precisely timed signals at the satellite in the second position and automatically retransmitting such signals to the craft, and receiving the retransmitted signals at the craft whereby the range from the craft to the second position of a satellite may be determined, and the two determined ranges determine the position of the craft in the absence of any transmission therefrom.

10. A range measurement navigation system for locating the position of a craft with respect to the earth comprising a ranging-signal-repeater vehicle passing above the earth in a path which may be accurately determined, a ground station located substantially at the surface of the earth, said ground station provided with transmitter and receiver means for line-of-sight communication with said vehicle, said vehicle provided with transmitter and receiver means for line-of-sight communication with said ground station and for line-of-sight communication between said vehicle and a craft whose position is to be located with respect to the earth, the craft provided with transmitter and receiver means for line-of-sight communication with said vehicle, and said ground station further provided with a means for accurately determining positions of said vehicle at any particular instant of time, and computer means responsive to accurately determined vehicle positions and to range measurements between said vehicle and the craft as determined by repeated ranging-signals transmitted by said vehicle whereby the computer may accurately calculate the position of the craft with respect to the earth.

11. A range measurement navigation system for locating the position of a craft with respect to the earth comprising a ranging-signal-repeater vehicle passing above the earth in a path which may be accurately determined, a ground station located at an accurately known position substantially at the surface of the earth, said ground station provided with transmitter means for transmitting ranging-signals to said vehicle, said ground station further provided with receiver means for receiving repeated ranging-signals from said vehicle, said vehicle provided with receiver means for receiving the ground station-transmitted ranging-signals and for subsequently receiving repeated ranging-signals from a craft whose position is to be located with respect to the earth, said vehicle further provided with transmitter means for automatically repeating the ranging-signals upon reception thereof from said ground station and also for automatically repeating craft-repeated ranging-signals upon subsequent reception thereof from the craft, the craft provided with receiver and transmitter means for receiving from and automatically retransmitting to said vehicle the ground station-transmitted ranging-signals repeated by said vehicle, and said ground station further provided with means for accurately determining locations of said vehicle at any particular instant of time, and computer means responsive to accurately determined vehicle locations and to range measurements between said vehicle and the craft wherein each range measurement is determined by a time interval between reception at the ground station of the ground station ranging-signals repeated by said vehicle and the craft-repeated ranging-signals subsequently repeated by said vehicle whereby the computer may accurately calculate the position of the craft with respect to the earth.

12. A range measurement navigation system for locating the position of a craft with respect to the earth comprising a pair of spaced apart satellites in accurately defined orbits about the earth, a ground station located substantially at the surface of the earth, said ground station provided with transmitter and receiver means for line-of-sight communication with said satellites, said satellites each provided with transmitter and receiver means for line-of-sight communication between each said satellite and said ground station and for line-of-sight communication between each said satellite and a craft whose position is to be located with respect to the earth, the craft provided with transmitter and receiver means for line-of-sight communication between the craft and each said satellite, and said ground station further provided with means for accurately determining locations of said satellites at any particular instant of time, and computer means responsive to accurately determined satellite locations and to range measurements between the craft and each of said satellites as determined by repeated ranging-signals transmitted by said satellites whereby the computer may accurately calculate the position of the craft with respect to the earth.

13. A range measurement navigation system for locating the position of a craft with respect to the earth comprising a pair of spaced apart satellites in accurately defined orbits about the earth, a ground station located at an accurately known position substantially at the surface of the earth, said ground station provided with transmitter means for transmitting ranging-signals to a first of said pair of satellites at a first time interval and for transmitting ranging-signals to a second of said pair of satellites at a second time interval, said ground station further provided with receiver means for receiving repeated ranging-signals from each of said satellites, said satellites each provided with receiver means for receiving particular ranging-signals transmitted by said ground station to that satellite and for subsequently receiving repeated ranging-signals from a craft whose position is to be located with respect to the earth, said satellites each further provided with transmitter means for automatically repeating the particular ranging-signals upon reception thereof from said ground station and also for automatically repeating craft-repeated ranging-signals upon subsequent reception thereof from the craft, the craft provided with receiver and transmitter means for receiving from and automatically retransmitting respectively to each said satellites the ground station-transmitted ranging-signals repeated by that satellite, and said ground station further provided with means for accurately determining locations of each satellite at any particular instant of time, and computer means responsive to an accurately determined location of each satellite and to a range measurement between the craft and each of said satellites wherein each range measurement is determined by a time interval between reception at the ground station of the ground station ranging-signals repeated by a satellite and the craft-repeated ranging-signals subsequently repeated by that satellite whereby the computer may accurately calculate the position of the craft with respect to the earth.

14. A range measurement navigation system for locating the position of a craft with respect to the positions in space of a selected plurality of reference vehicles comprising a plurality of spaced apart ranging-signal-repeater vehicles passing above the earth in paths which may be accurately determined, a plurality of ground stations located at widely spaced apart and accurately known positions on the surface of the earth, said ground stations each provided with transmitter means for transmitting ranging-signals to said vehicles within line-of-sight communication therewith, a ground station in line-of-sight communication with and in proximity to a selected plurality of said vehicles adapted to sequentially transmit ranging-signals to each of said selected plurality of vehicles wherein said selected plurality of vehicles are in closest proximity to a craft whose position is to be located with respect to the positions in space of said selected plurality of vehicles, said ground stations each further provided with receiver means for receiving repeated ranging-signals from said vehicles within line-of-sight communication therewith, said plurality of vehicles each provided with receiver means for receiving particular ranging-signals transmitted by a ground station to that vehicle and said selected plurality of vehicles adapted to subsequently receive repeated ranging-signals from the craft, said plurality of vehicles each further provided with transmitter means for automatically repeating the particular ranging-signals upon reception thereof from a ground station and said selected plurality of vehicles automatically repeating craft-repeated ranging-signals upon subsequent reception thereof from the craft, the craft provided with receiver and transmitter means for receiving from an automatically retransmitting respectively to each of said selected plurality of vehicles the ground station-transmitted ranging-signals repeated by that vehicle, and said ground stations each further provided with a means for accurately determining locations of each vehicle in line-of-sight communication therewith at any particular instant of time, and computer means responsive to accurately determined vehicle locations, the computer means provided at the ground station in line-of-sight communication with and in closest proximity to said selected plurality of vehicles being further responsive to a range measurement between the craft and each of said selected plurality of vehicles wherein each range measurement is determined by a time interval between reception at the ground station of the ground station ranging-signals repeated by one of the selected plurality of vehicles and the craft-repeated ranging-signals subsequently repeated by that vehicle whereby the computer may accurately calculate the position of the craft with respect to the positions in space of the selected plurality of vehicles.

15. A passive mode range measurement navigation system for locating the position of a craft with respect to the earth comprising two pairs of spaced apart ranging-signal-repeater vehicles passing above the earth in paths which may be accurately determined, a ground station located substantially at the surface of the earth, said ground station provided with transmitter means for line-of-sight communication with said vehicles, said vehicles each provided with transmitter and receiver means for line-of-sight communication between each said vehicle and said ground station and for line-of-sight communication between each said vehicle and a craft whose position is to be located with respect to the earth, the craft provided with receiver means for line-of-sight communication between the craft and each said vehicle and said ground station further provided with means for accurately determining locations of said vehicles at particular instants of time whereby transmission from the ground station to a first pair of the vehicles of the accurately determined locations thereof and precisely timed signals and repetition thereof by said first pair of vehicles and a subsequent transmission from the ground station to a second pair of the vehicles of the accurately determined locations thereof and precisely timed signals and repetition thereof by said second pair of vehicles provides the craft with reference positions for determination of range measurements between the craft and known position of said vehicles whereby the position of the craft may be determined at the craft in the absence of any transmission by the craft.

16. The combination set forth in claim 11 wherein said ground station is further provided with an accurate clock timed to a national time standard whereby precisely timed signals transmitted by said ground station in synchronism with the accurate clock are received by the vehicle having an accurately known position and retransmitted thereby to the craft at an accurately known position thereof to provide a remote time synchronization system whereby a clock at said craft may be synchronized to the clock at said ground station.

17. The combination set forth in claim 13 wherein said ground station is further provided with an accurate clock timed to a national time standard, and the craft is further provided with a clock having a high degree of stability that may be synchronized to the clock of said ground station at the craft's point of departure, means for transmitting precisely timed signals synchronized to the national time standard from the ground station to the pair of satellites at accurately known positions thereof whereby the reception of the precisely timed signals at said craft upon retransmission by said satellites determines the position of said craft with respect to the earth.

18. The combination set forth in claim 10 wherein said vehicle transmitter and receiver means comprises an antenna for receiving and transmitting signals therefrom, a diplexer connected to the antenna for directing received signals to a first electronic circuit and for directing transmitted signals to the antenna, said first electronic circuit including
- a radio frequency amplifier connected to an output of said diplexer,
- first and second intermediate frequency amplifiers connected to an output of said radio frequency amplifier, said first intermediate frequency amplifier having a relatively narrow bandwidth and said second amplifier having a relatively wide bandwidth, and
- a pulse shaper circuit connected to an output of said intermediate frequency amplifiers, outputs of said pulse shaper circuit connected to an input of a transmitter whereby ranging-signals received and repeated by the vehicle pass through the relatively wide bandwidth amplifier and signals describing the vehicle position pass through the relatively narrow bandwidth amplifier.

References Cited

UNITED STATES PATENTS

| | | | |
|---|---|---|---|
| 3,126,545 | 3/1964 | Smith | 343—100 |
| 3,222,672 | 12/1965 | Forestier | 343—7.5 |

OTHER REFERENCES

Lytel, A., Uses of New Satellites, March 3, 1961, pp. 54, 55, 102, 103, Electronics World.

Etcheverry, R., et al., Proposed Method of Navigation on the Earth by Means of an Earth Satellite, 1959, pp. 220–225, U.S. Naval Ordnance Test Station.

Skolnik, M. I., Introduction to Radar Systems, 1962, p. 1, McGraw-Hill Book Co.

RODNEY D. BENNETT, *Primary Examiner.*

CHESTER L. JUSTUS, *Examiner.*

B. L. RIBANDO, *Assistant Examiner.*